April 8, 1952  MacKELLAR K. GRAHAM  2,591,806
POWER TRANSMISSION
Filed May 8, 1946
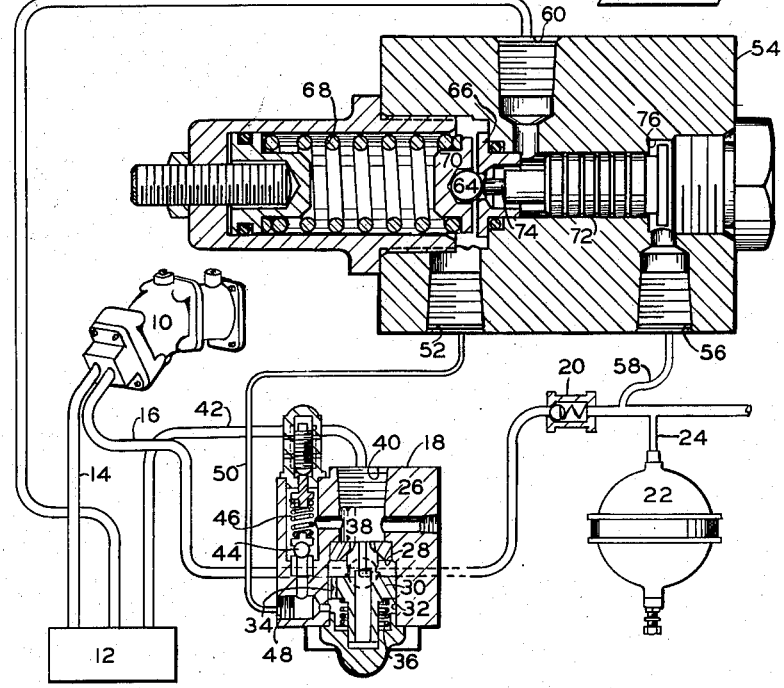
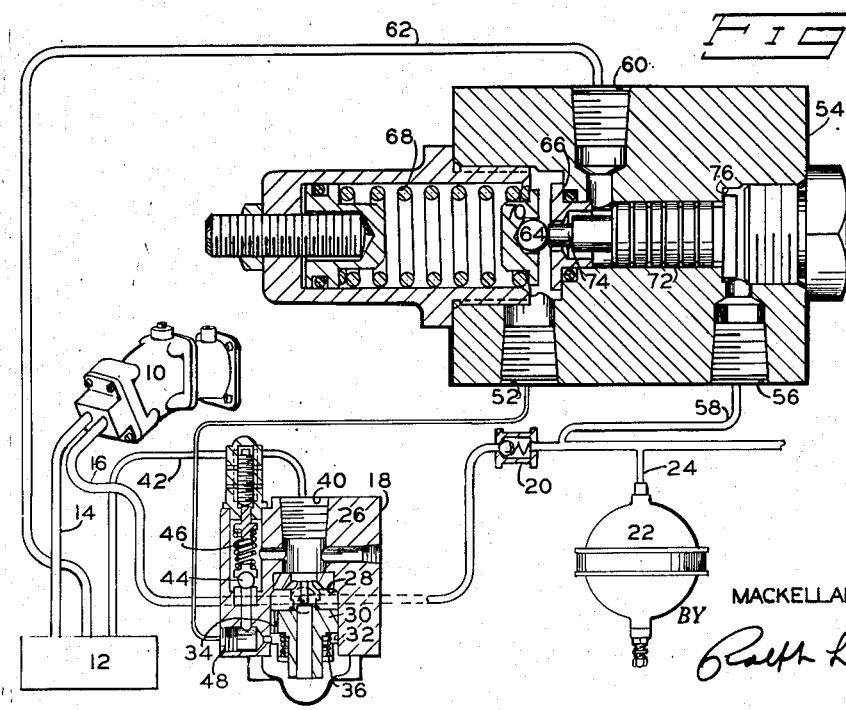
INVENTOR.
MACKELLAR K. GRAHAM
BY
Ralph L. Tweedale
ATTORNEY Patented Apr. 8, 1952

2,591,806

UNITED STATES PATENT OFFICE 2,591,806

POWER TRANSMISSION

MacKellar K. Graham, Detroit, Mich., assignor to Vickers Incorporated, Detroit, Mich., a corporation of Michigan Application May 8, 1946, Serial No. 668,121

7 Claims. (Cl. 103—42)

1

This invention relates to power transmissions, particularly to those of the type comprising two or more fluid pressure energy translating devices, one of which may function as a pump and another as a fluid motor.

The invention is particularly concerned with providing in a hydraulic system having a continuously driven pump an improved simple and economical means of having a relief valve incorporated in the system as a safety element for relieving the pump of excessive pressure fluid when a maximum predetermined pressure has been reached in the system also perform the function of unloading the pump at a lower pressure than the maximum relief valve pressure.

In aircraft hydraulic systems where the pump is being driven continuously by the aircraft engine it has been the practice to use an unloading valve to unburden the pump of all but slight loads when hydraulically actuated elements such as the landing gear are not being operated. The unloading valve in such systems loads and unloads the pump in response to predetermined pressure increases and decreases in an accumulator provided therein.

In addition to the unloading valve a separate relief valve is always provided in such systems which is responsive to a higher pressure than the unloading valve and which is used only as a safety element in case the unloading valve fails to operate. In such systems some difficulty has been experienced with unloading valves which fail to unload completely, that is they are subject to "hanging up" or incomplete operation after starting to unload the pump thus placing a continuous burden thereon.

It is an object of this invention to incorporate in a hydraulic system having a continuously driven pump a pressure responsive relief valve of the balanced type and a pressure actuated snap acting valve in such a manner that the relief valve will perform the double function of a relief valve and of an unloading valve.

It is a further object of this invention to provide in a hydraulic system having a continuously driven pump a pressure responsive relief valve of the balanced type and a positive and snap acting pressure actuated valve in such a manner that the relief valve will not only perform the double function of a relief valve and of an unloading valve but which will prevent the relief valve when acting as an unloading valve from oscillating or hanging up and assure positive unloading of the pump.

Further objects and advantages of the present

2 invention will be apparent from the following description, reference being had to the accompanying drawing wherein a preferred form of the present invention is clearly shown.

In the drawing:

Figure 1 is a diagrammatic view of the invention.

Figure 2 is a diagrammatic view of the invention similar to that of Figure 1 but showing the parts thereof in a different position of operation.

Referring now to Figure 1, there is shown a pump 10 which is adapted to be continuously driven by a prime mover, not shown, and which is connected to a tank 12 by means of a suction conduit 14. A pump delivery conduit 16 is connected to pump 10 incorporated in which is a balanced type relief valve 18, a check valve 20 and an accumulator 22 which is connected to conduit 16 by means of a branch conduit 24.

The relief valve 18 is comprised of a body 26 having an inlet chamber 28 connected to the pump delivery conduit 16. A main valve 30 reciprocably mounted in the body is balanced as to pressure forces in the inlet chamber 28 and a control chamber 32, the latter of which is in communication with the inlet chamber 28 by means of a restricted passage 34 in the valve 30. The main valve 30 is normally biased by means of a spring 36 mounted in the control chamber 30 so as to close a seat 38 and block communication between the inlet chamber 28 and an exhaust port 40, the latter being connected to tank 12 by means of a by-pass conduit 42.

The pressure forces acting on main valve 30 may become unbalanced by venting or bleeding the control chamber 32 to tank 12. For this purpose the pilot relief valve 44 normally biased to a position closing communication between the control chamber 32 and the exhaust port 40 by means of a spring 46 will open communication therebetween when a predetermined maximum safe pressure as determined by the resistance of spring 46 rises in the system.

A venting port 48 of relief valve 18 connected to control chamber 32 is connected by means of a conduit 50 to a control port 52 of a positive and snap acting valve 54, also having a pressure port 56 connected to the pump delivery conduit 16 by means of a branch conduit 58 and a venting port 60 connected to tank 12 by means of a conduit 62. Communication between control port 52 and venting port 60 is controlled by a poppet valve 64 which is normally biased to close a seat 66 by means of a spring 68 the resistance of which is adjustable to suit the needs of a plurality of hydraulic systems.

A spring retainer 70 also acts as a guide for proper seating of valve 64. A piston 72 reciprocably mounted in valve 54 and having a projection 74 extending into the seat 66 is responsive to predetermined increases of pressure in a chamber 76 in communication with port 56 to shift valve 64 to open seat 66 and responsive to predetermined pressure decreases in the same chamber permitting spring 68 and pressure fluid to shift the valve 64 to the closed position.

In operation, with the pump 10 running pressure fluid is delivered by conduit 16 to the inlet chamber 28 of relief valve 18 and through check valve 20 to a part of the hydraulic system not shown and also to accumulator 22 and to the pressure port 56 of valve 54. When a predetermined pressure has arisen in accumulator 22 which is also present in chamber 76 of valve 54, piston 72 will shift. It should be noted that the force opposing the movement of piston 72 up to the time of valve 64 opening seat 66 is a product of the area of the ball seat and pressure plus the resistance of spring 68.

Referring now to Figure 2 at the point that valve 64 is lifted slightly from seat 66 opening the same there is a sudden reduction of the total force opposing the movement of piston 72 because the total pressure force on top of the ball suddenly drops by reason of port 52 being opened to port 60. Due to the fact that the same increasing pressure force has remained existent in chamber 76 the result is a rapid upward movement of piston 72 and consequently valve 64 opens seat 66 sufficiently to connect port 52 to exhaust port 60 and vent the control chamber 32 of relief valve 18 to tank 12.

During this operation pressure fluid from pump 10 had also been delivered by means of conduit 16 to the inlet chamber 28 of relief valve 18 and through the restricted passage 34 of main valve 30 to the control chamber 32 thereof and thus balance the pressure forces upon the valve 30 to permit the spring 36 to maintain valve 38 in the closed position blocking communication between the inlet chamber 28 of valve 18 and exhaust port 40.

Pressure fluid entering the control chamber 32 by means of restricted passage 34 had also been delivered by means of vent port 48 of valve 18 and conduit 50 to control port 52 of valve 54 where communication with venting port 60 was blocked by means of valve 64 closing seat 66. However, with venting port 60 being open to port 52 when valve 64 was shifted suddenly and completely the control chamber 32 of valve 18 is also open to tank 12 resulting in a sudden decrease in pressure in the control chamber 32 and permitting pressure fluid in inlet chamber 28 to shift main valve 30 so as to open the exhaust port 40 thereof to tank 12 and by-pass the complete flow of pump 10 to tank 12.

Pressure fluid trapped in accumulator 22 by means of check valve 20 will maintain piston 72 to the position shown in Figure 2. Due to the fact that control chamber 32 is vented to tank 12 a pressure sufficient to create a force to overcome the slight resistance of spring 36 is the only load resistance imposed upon the pump 10.

Upon a predetermined decrease in pressure in accumulator 22 also present in chamber 76 spring 68 of valve 54 will overcome the resultant force upon piston 72 and shift valve 64 toward the closed position. As valve 64 nears the completely closed position a sudden build up of pressure will take place on top of valve 64 due to the now restricted opening of seat 66 and aid spring 68 in suddenly and completely shifting valve 64 to close seat 66.

Once the valve 64 is suddenly seated so as to close communication between port 52 and exhaust port 60 of valve 54 the control chamber 32 of relief valve 18 is no longer open to tank 12 and consequently the pressure forces in inlet chamber 28 and control chamber 32 suddenly become balanced permitting spring 36 to shift main valve 30 to the closed position and close seat 38. Pressure fluid now delivered from pump 10 through delivery conduit 16 is again free to flow through inlet chamber 28 check valve 20 to accumulator 22 and to the system, not shown.

If for any reason piston 72 should become frozen, pilot valve 44 of relief valve 18, which is set to open control chamber 32 to exhaust port 40 thereof at a higher pressure than valve 64 of valve 54 is set to open port 52 to exhaust port 60 thereof, will serve as a safety element in preventing extensive damage to the system. In such case when a predetermined safe maximum pressure has been reached in the system as determined by spring 46 of relief valve 18, pilot valve 44 will open control chamber 32 to exhaust port 40. The pressure forces in inlet chamber 28 and control chamber 32 which had been balanced now become unbalanced and main valve 30 will shift so as to open seat 38 to exhaust port 40 and by-pass the complete flow of pump 10 to tank 12.

However, in this case main valve 30 of relief valve 18 is merely serving as a safety element in relieving excessive pressure fluid from pump 10 to tank 12 and a continuous predetermined pressure equal to the resistance of pilot valve spring 46 is necessary to maintain valve 44 in the open position. In the former case with valve 18 operating as an unloading valve pressure fluid trapped in accumulator 22 by means of check valve 20 and not pressure fluid being delivered by pump 10 maintains control chamber 32 open to tank 12.

It should be noted that because valve 64 is suddenly and completely vented to tank when a predetermined pressure has arisen in accumulator 22 that control chamber 32 of valve 18 is also suddenly and completely vented to tank and consequently main valve 30 is prevented from hanging up and will shift so as to completely unload pump 10. In addition, the snap action of valve 64 and the complete venting of control chamber 32 will prevent any oscillation of main valve 30 when relief valve 18 is operating as an unloading valve.

While the form of embodiment of the invention as herein disclosed constitutes a preferred form, it is to be understood that other forms might be adopted, all coming within the scope of the claims which follow.

What is claimed is as follows:

1. In combination with a pressure relief valve of the type which is balanced as to opposing pressure forces and having a control chamber ventable at a predetermined pressure for unbalancing the pressure forces and causing the relief valve to by-pass excessive pressure fluid, a valve having a control port connected to the control chamber of the relief valve, a pressure port, a venting port, a poppet valve for controlling communication between the control port and the venting port including means biasing the valve to the closed communication position, and means responsive to predetermined pressure increases at the pressure port lower than the first mentioned pressure for shifting the poppet valve to open communication between the control port and the venting port thereby opening communication between the venting port and the control chamber of the relief valve for causing the pressure forces on the relief valve to become completely unbalanced.

2. In combination with a pressure relief valve of the type which is balanced as to opposing pressure forces and having a control chamber ventable at a predetermined pressure for unbalancing the pressure forces and causing the relief valve to by-pass excessive pressure fluid, a valve having a control port connected to the control chamber of the relief valve, a pressure port, a venting port, a valve seat between the control and venting ports, a poppet valve biased by pressure corresponding to that in the control chamber of the relief valve for normally closing the seat, resilient means also biasing the valve to close the seat, and means responsive to predetermined pressure increases at the pressure port lower than the first mentioned pressure for overcoming the pressure and resilient biasing forces, and shifting the poppet valve to connect the venting port with the control chamber of the relief valve, whereby the pressure forces on the relief valve become completely unbalanced.

3. In a hydraulic power transmission system having a fluid pump forming a source of pressure fluid and a pressure responsive relief valve of the type which is balanced as to opposing pressure forces and having a control chamber ventable at a predetermined pressure for unbalancing the pressure forces and causing the relief valve to by-pass excessive pressure fluid, said transmission having sufficient fluid capacity and elasticity of members under stress to provide an accumulator effect, the combination with said relief valve of snap-acting valve means connected to the control chamber of the relief valve, said snap acting valve means being operable to vent the control chamber in response to a predetermined pressure lower than the first mentioned pressure and causing the relief valve to unload the pump.

4. In a hydraulic power transmission system having a pump forming a source of pressure fluid, an accumulator for storing pressure fluid, and a pressure responsive relief valve of the type which is balanced as to opposing pressure forces and having a control chamber ventable at a predetermined pressure for unbalancing the pressure forces and causing the relief valve to by-pass the pump, the combination with said relief valve of snap-acting valve means connected to the control chamber of the relief valve and to the accumulator, said snap acting valve means being operable to vent the control chamber in response to predetermined pressure increases in the accumulator lower than the first predetermined pressure and causing the relief valve to unload the pump.

5. In a hydraulic power transmission system having a pump forming a source of pressure fluid, an accumulator for storing pressure fluid, a pressure relief valve of the type which is balanced as to opposing pressure forces including a ventable control chamber, and a pilot relief valve operably connected to the control chamber and responsive at a predetermined pressure for venting the control chamber thereby unbalancing the pressure forces and causing the relief valve to by-pass the pump, the combination with said relief valve and pilot valve of an auxiliary pressure responsive valve connected to the control chamber of the relief valve and to the accumulator, said auxiliary valve being operable to vent the control chamber in response to predetermined pressure increases in the accumulator lower than the pilot relief valve predetermined responsive pressure and causing the relief valve to unload the pump.

6. In a hydraulic power transmission system having a pump forming a source of pressure fluid, an accumulator for storing pressure fluid, a pressure relief valve of the type which is balanced as to opposing pressure forces including a ventable control chamber, and a pilot relief valve operably connected to the control chamber and responsive at a predetermined pressure for venting the control chamber thereby unbalancing the pressure forces and causing the relief valve to by-pass the pump, the combination with said relief valve and pilot valve of snap-acting valve means operably connected to the accumulator and to the control chamber of the relief valve, said snap-acting valve means being operable to vent the control chamber in response to predetermined pressure increases in the accumulator lower than the pilot relief valve predetermined responsive pressure and causing the relief valve to unload the pump.

7. In a hydraulic power transmission system having a pump forming a source of pressure fluid, an accumulator for storing pressure fluid, and a pressure responsive relief valve of the type which is balanced as to opposing pressure forces and having a control chamber ventable at a predetermined pressure for unbalancing the pressure forces and causing the relief valve to by-pass the pump, the combination with said relief valve of a valve for causing the relief valve to unload the pump, said valve comprising a body having a venting port, a control port connected to the control chamber of the relief valve and a pressure port connected to the accumulator, a poppet valve between the control and venting ports, means biasing the poppet valve to close communication between the control and venting ports, and means connected to the pressure port responsive to predetermined pressure increases at said port lower than the first mentioned relief valve predetermined pressure for shifting the poppet valve to open the control port to the venting port thereby causing the pressure forces on the relief valve to become completely unbalanced and causing the relief valve to unload the pump.

MacKELLAR K. GRAHAM.

REFERENCES CITED

The following references are of record in the file of this patent:

UNITED STATES PATENTS

| Number | Name | Date |
|---|---|---|
| 703,220 | White | June 24, 1902 |
| 1,110,567 | McAulay | Sept. 15, 1914 |
| 1,451,481 | Vincent | Apr. 10, 1923 |
| 1,663,647 | Brush | Mar. 27, 1928 |
| 1,801,414 | Davis | Apr. 21, 1931 |